US008767367B2

(12) United States Patent
Higuchi et al.

(10) Patent No.: US 8,767,367 B2
(45) Date of Patent: *Jul. 1, 2014

(54) WIRE PROTECTION METHOD AND WIRE PROTECTION DEVICE

(71) Applicants: Yutaka Higuchi, Yokkaichi (JP); Seiji Takahashi, Yokkaichi (JP)

(72) Inventors: Yutaka Higuchi, Yokkaichi (JP); Seiji Takahashi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,083

(22) Filed: Feb. 21, 2013

(65) Prior Publication Data

US 2013/0163138 A1     Jun. 27, 2013

Related U.S. Application Data

(63) Continuation of application No. 12/734,684, filed as application No. PCT/JP2008/070097 on Nov. 5, 2008, now Pat. No. 8,405,946.

(30) Foreign Application Priority Data

Nov. 19, 2007   (JP) .................................. 2007-299647

(51) Int. Cl.
*H02H 5/04*      (2006.01)
(52) U.S. Cl.
USPC ......................................................... 361/103
(58) Field of Classification Search
USPC ......................................................... 361/103
See application file for complete search history.

(56) References Cited

U.S. PATENT DOCUMENTS

| 5,225,992 A | 7/1993 | Kobari et al. |
| 2007/0253132 A1* | 11/2007 | Nakamura et al. ............ 361/103 |
| 2010/0254059 A1 | 10/2010 | Higuchi et al. |

FOREIGN PATENT DOCUMENTS

| DE | 10257425 A1 | 6/2004 |
| JP | A-61-92119 | 5/1986 |
| JP | A-63-204307 | 8/1988 |
| JP | A-7-222345 | 8/1995 |
| JP | A-08-242533 | 9/1996 |
| JP | A-9-200949 | 7/1997 |

(Continued)

OTHER PUBLICATIONS

Mar. 5, 2013 Office Action issued in Chinese Patent Application No. 200880116536.2 (with English translation).

(Continued)

*Primary Examiner* — Dharti Patel
(74) *Attorney, Agent, or Firm* — Oliff PLC (57) ABSTRACT

With a wire protection method in accordance with the present invention, the method being used for supplying electric power from a power source to a load, an applied-current to the load is detected every predetermined time, A wire rise temperature is calculated using the detected applied-current I(n) and by a relational expression concerning heat radiation and heat generation of the wire. The calculated rise in temperature is added to a reference temperature so that a wire temperature is estimated. When the estimated wire temperature is lower than a predetermined upper limit temperature, the calculation of the rise in temperature is repeated. When the estimated wire temperature has become equal to or higher than the predetermined upper limit temperature, the electric power supply from the power source to the load is stopped so that the wire is protected.

17 Claims, 11 Drawing Sheets

(56) References Cited

FOREIGN PATENT DOCUMENTS

| JP | A-9-215180 | 8/1997 |
|----|------------|--------|
| JP | A-10-51944 | 2/1998 |
| JP | A-10-68754 | 3/1998 |
| JP | A-11-139223 | 5/1999 |
| JP | A-2002-238147 | 8/2002 |
| JP | A-2007-295776 | 11/2007 |

OTHER PUBLICATIONS

Japanese Trial Decision issued in Japanese Patent No. 4624400 dated Apr. 13, 2012 (with English translation).
International Search Report issued in International Application No. PCT/JP2008/070097 on Jan. 13, 2009 (with English translation).
Japanese Office Action issued in Japanese Patent Application No. 2007-299647 on Jan. 7, 2010 (with translation).
German Office Action issued Jul. 3, 2012 in Application No. 11 208 003 096.0 (with English translation).
Jun. 1, 2010 Office Action issued in Japanese Patent Application No. 2007-299647 (with translation).
"Automotive parts-Current capacity of low tension cables" Japanese Automobile Standard JASO D609:2001, pp. 1-35 (with translation).
Jan. 13, 2009 Written Opinion issued in PCT/JP2008/070097 (with translation).
Japanese Information Offer Form issued in Japanese Application No. 2007-299647 on Mar. 23, 2010 (with translation).
Jun. 20, 2012 Office Action issued in U.S. Appl. No. 12/734,684.
Jul. 3, 2012 Chinese Office Action issued in Chinese Application No. 200880116536.2 (with translation).
Nov. 20, 2012 Notice of Allowance issued in U.S. Appl. No. 12/734,684.

\* cited by examiner

$$\Delta Tw(n) = \underbrace{\Delta Tw(n-1) \times \exp(-\frac{\Delta t}{\tau w})}_{\substack{\text{TEMPERATURE} \\ \text{RISE}}} + \underbrace{\overset{\substack{\text{HEAT} \\ \text{RESISTANCE}}}{Rthw} \times \overset{\substack{\text{WIRE} \\ \text{RESISTANCE}}}{Rw(n-1)} \times \overset{\text{CURRENT}}{I(n-1)^2} \times (1-\exp(-\frac{\Delta t}{\tau w}))}_{\text{HEAT GENERATION (PRIMARY DELAY)}}$$

FIG.5

$$\Delta Tw(n) = \Delta Tw(n-1) + (Rthw \times Rw(n-1) \times I(n-1)^2 - \Delta Tw(n-1)) \times (1-\exp(-\frac{\Delta t}{\tau w}))$$

LET $A = \exp(-\frac{\Delta t}{\tau w})$, THEN $$= \Delta Tw(n-1) + (Rthw \times Rw(n-1) \times I(n-1)^2 - \Delta Tw(n-1)) \times (1-A)$$

$$= (1-A) \times (Rthw \times Rw(n-1) \times I(n-1)^2) + A \times \Delta Tw(n-1)$$

I(n): CURRENT VALUE (A) IN N-TH SAMPLING
ΔTW(n): HARNESS RISE TEMPERATURE (°C) IN N-TH SAMPLING
RW(n): HARNESS RESISTANCE (Ω) IN N-TH SAMPLING
RW(0): HARNESS RESISTANCE (Ω)
Rthw: HARNESS HEAT RESISTANCE (Ω)
τ w: HARNESS HEAT-RADIATION TIME CONSTANT (°C/W)
κ w: HARNESS RESISTANCE TEMPERATURE COEFFICIENT (/°C)
Δ t: SAMPLING INTERVAL (S)

WIRE PROTECTION METHOD AND WIRE PROTECTION DEVICE

This is application is a Continuation of application Ser. No. 12/734,684 filed May 17, 2010, which is a 371 application of PCT/JP2008/070097 filed Nov. 5, 2008, which receives the benefit of priority from JP-2007-299647 filed Nov. 19, 2007. The disclosure of the prior applications is hereby incorporated by reference herein in its entirety.

TECHNICAL FIELD

The present invention relates to wire protection methods and wire protection devices or, in particular, to a wire protection method and a wire protection device, the wire being used for supplying electric power from a power source to a load.

BACKGROUND ART

A vehicle wire harness could be deteriorated, or worn out, and allow a core wire thereof to have electrical contact with a body etc. and be short-circuited. Therefore, in order to protect smoking of the wire coating and a current control element (a switching element) due to such short-circuiting, a thermal fuse has conventionally been used. The thermal fuse detects an overheated state and breaks. However, as electric parts increase, use of such a thermal fuse has been arising a problem of maintaining a space for the thermal fuse to be mounted. Moreover, recovering after break requires replacing with a new thermal fuse, and thus maintenance is troublesome. Besides, in a case where current is repetitively applied to a load (such as a headlamp) that has large inrush current, the thermal fuse tends to be deteriorated, and the breaking time thereof becomes shorter. Moreover, while the breaking time varies due to an initial variation and the temperature-dependent properties, breaking shall not occur during normal operation. Accordingly, a thermal fuse having a current capacity larger to some extent has to be used. This accompanies a problem that a thicker wire that has a larger smoking current and can be protected by the thermal fuse has to be used.

Furthermore, in recent years, Patent Document Japanese Unexamined Patent Application H11-139223 has reported an art to attach a temperature sensor directly to the wire, to measure a temperature of the wire and, when the wire reaches an abnormal temperature, and to break an applied-current.

DISCLOSURE OF THE INVENTION

Problem to Be Solved by the Invention

By the way, the method that attaches a temperature measuring element (such as a linear thermistor) to the wire harness itself and directly measures the temperature of the harness as disclosed in the above-mentioned publication causes inconveniences of complexity of the structure and increase of the cost. Moreover, in a case where the temperature rises in a single wire located in a vicinity of the center, accurate tracking of the temperature is impossible.

Therefore, the present invention was achieved on a basis of the circumstances as explained above, and its purpose is to provide a wire protection method and a protection device, the method and device being capable of reliably protecting the wire with a simple structure against temperature rise due to various short-circuited currents.

Means for Solving the Problem

As a means for achieving the above-explained purpose, the wire protection method in accordance with an aspect of the present invention is a wire protection method of protecting a wire used for supplying electric power from a power source to a load. The method includes the steps of detecting an applied-current to the load every predetermined time; calculating a temperature change in the wire per the predetermined time using the detected applied-current; and estimating a temperature of the wire. The estimating includes calculating a rise in temperature of the wire using the wire temperature change per the predetermined time and adding the wire rise temperature to a reference temperature. The method also includes the steps of determining whether the estimated wire temperature is lower than a predetermined upper limit temperature; newly estimating the wire temperature upon determination in the determining step that the estimated wire temperature is lower than the predetermined upper limit temperature. The newly estimating includes calculating the wire temperature change per the next predetermined time, newly calculating the wire rise temperature using the calculated wire temperature change per the predetermined time, and adding the new wire rise temperature to the reference temperature. The method also includes a step of stopping the electric power supply from the power source to the load upon determination in the determining step that the estimated wire temperature is equal to or higher than the predetermined upper limit temperature.

Figure 11:
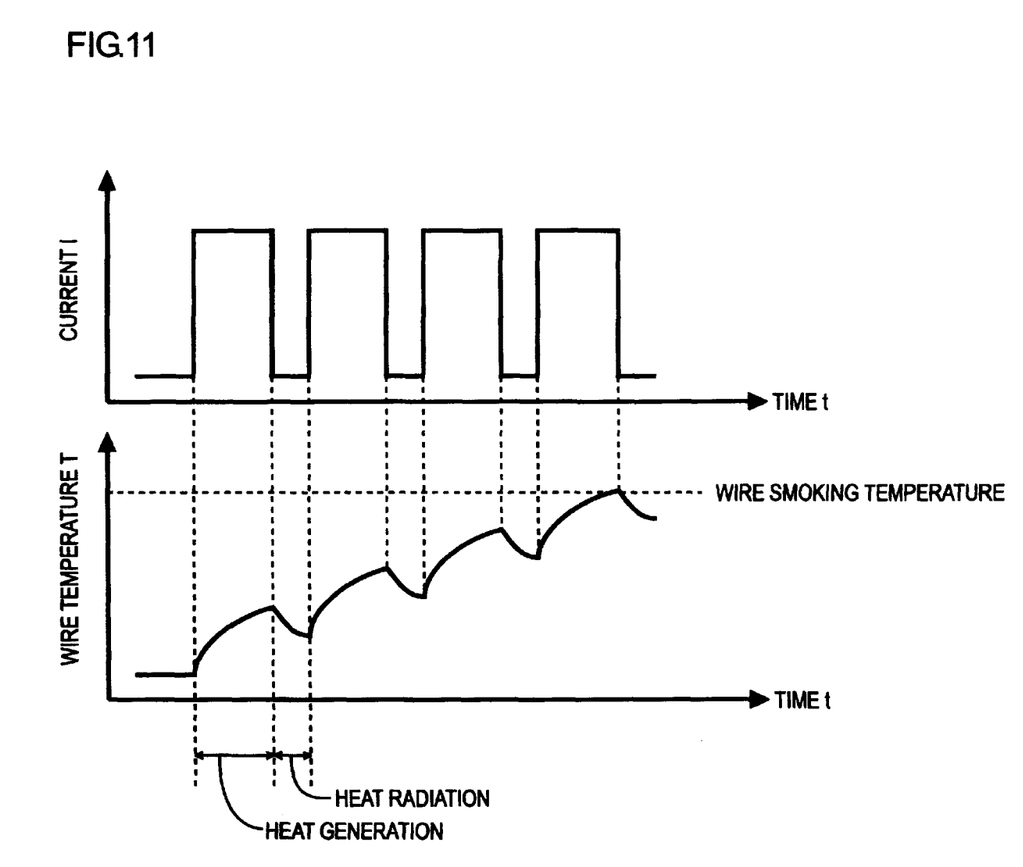
FIG. 11 is a graph illustrating a conventional relation between a step current and a wire temperature.

In this configuration, the applied-current is detected every predetermine time, a present wire temperature is estimated using the applied-current, and the present wire temperature and the upper limit temperature that the wire allows for are compared. This makes it possible to, even in a case where the wire rise temperatures due to a short-circuited current that repeats turning on/off as illustrated in FIG. 11, reliably detect the temperature rise, break the applied-current before the wire reaches the smoking temperature, thereby preventing the wire from smoking. Besides, while a conventional thermal fuse is deteriorated due to inrush current, such a factor of deterioration is not included in the present configuration. Moreover, the present configuration provides accurate temperature estimation. Thus, the current can be flown and be used until just before the wire smokes.

Furthermore, because the wire temperature is estimated only by detecting the applied-current, the structure of wire protection can be easily configured.

Furthermore, as another means for achieving the above-explained purpose, the wire protection device in accordance with an aspect of the present invention is a wire protection device that protects a wire provided between a power source and a load and used for supplying electric power from the power source to the load. The device includes: a semiconductor switching element that is provided in a current applying path from the power source to the load and switches the power supply to the load; a current detection circuit that detects an applied-current to the load every predetermined time, the applied-current flowing through the semiconductor switching element; an operation circuit that calculates a temperature change in the wire per the predetermined time using the detected applied-current, calculates a rise in temperature of the wire using the wire temperature change per the predetermined time, and adds the wire rise temperature to a reference temperature, thereby estimating a temperature of the wire; and a protection circuit that determines whether the estimated wire temperature is lower than a predetermined upper temperature. The protection circuit, upon determination that the estimated wire temperature is lower than the predetermined upper limit temperature, causes the operation circuit to calculate the wire temperature change per the next predetermined time, to newly calculate the wire rise temperature using the calculated wire temperature change per the predetermined time, and to newly estimate the wire temperature. The new estimation includes to add the new wire rise temperature to the reference temperature. The protection circuit, upon determination that the estimated wire temperature is equal to or higher than the predetermined upper limit temperature, turns off the semiconductor switching element and stops the electric power supply from the power source to the load.

DESCRIPTION OF PREFERRED EMBODIMENTS

<Illustrative Aspect>

An illustrative aspect in accordance with the present invention will be explained with reference to FIGS. 1 through 5. While a vehicle wire harness is intended as a wire to be protected in this illustrative aspect, the wire to be protected is not limited to this.

Figure 1:
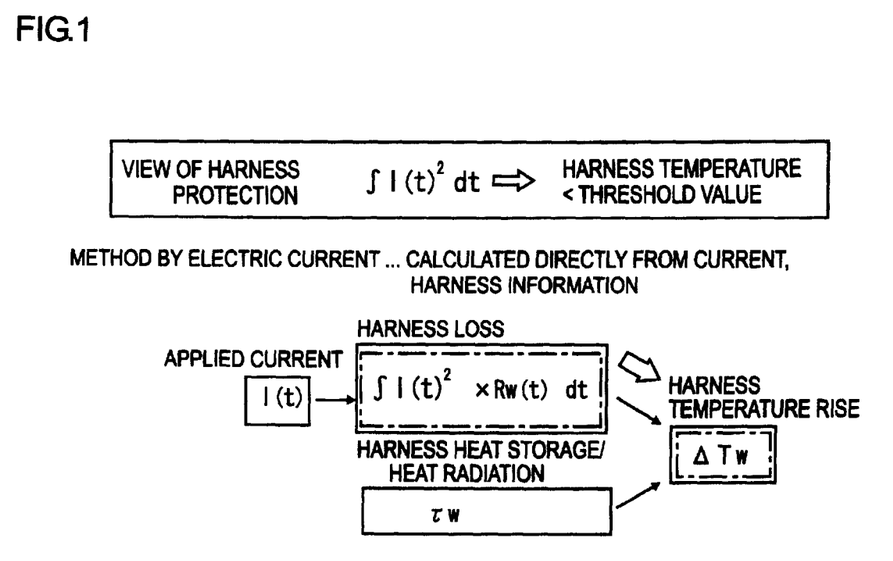
FIG. 1 is an explanatory view explaining a current protection method in accordance with the present invention.

FIG. 1 is an explanatory view illustrating a concept of the wire (the wire harness) in accordance with the present invention. As illustrated in FIG. 1, in the present invention, a rise in temperature $\Delta Tw$ in the harness is calculated directly from a loss of the harness due to an applied-current I, i.e. heat generation in the harness, and a heat-radiation time constant $\tau w$ of the harness. Next, a temperature of the harness is estimated from the harness rise temperature $\Delta Tw$. This estimated harness temperature and a predetermined threshold value (an upper limit value) are compared, and then, when the harness temperature is equal to or higher than the predetermined threshold value, the applied-current I is broken so that the harness is protected.

More specifically, detection of the applied-current I, which is supplied to a load via the wire (the wire harness), is performed every predetermined time, and calculation of a temperature change in the wire per the predetermined time is operated using the detected applied-current. Next, estimation of the wire temperature is performed. The estimation includes: calculating the wire rise temperature using the wire temperature change per the predetermined time; and adding the wire rise temperature to a reference temperature. Next, determination whether the estimated wire temperature is lower than a predetermined upper limit temperature is performed. Upon determination that the estimated wire temperature is lower than the predetermined upper limit temperature, new estimation of the wire rise temperature is performed. The new calculation includes: calculating the wire temperature change per the next predetermined time, newly calculating the wire rise temperature using the calculated wire temperature change per the predetermined time, and adding the new wire rise temperature to the reference temperature. Upon determination that the estimated wire temperature is equal to or higher than the predetermined upper limit temperature, stopping of electric power supply to the load is performed so that the wire is protected.

Figure 2:
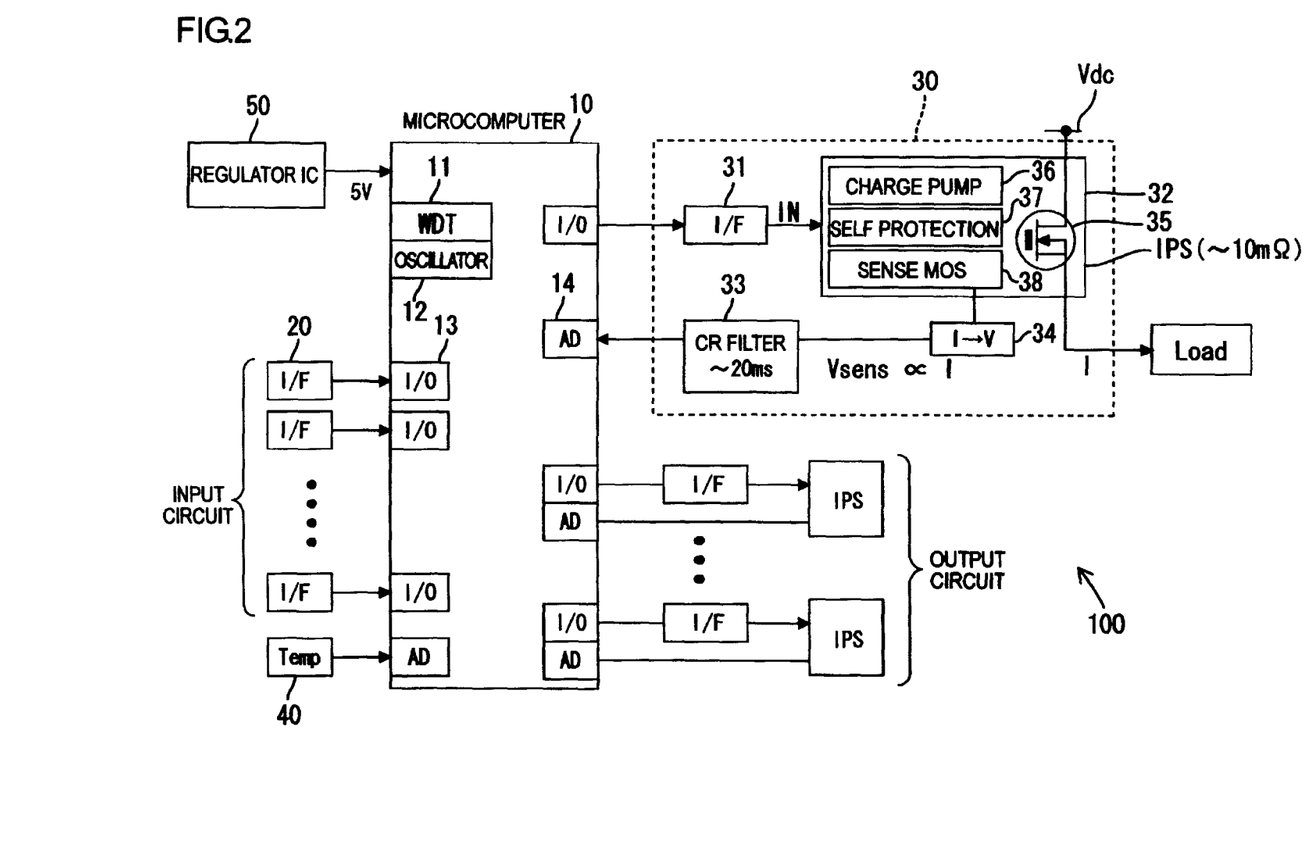
FIG. 2 is a schematic block diagram illustrating a configuration of a current protection device in accordance with the present invention.

Next, a wire protection device in accordance with the present invention will be explained with reference to FIG. 2. FIG. 2 is a schematic block diagram of the wire protection device 100 in accordance with the present invention. The wire protection device 100 includes a microcomputer 10, a plurality of (eight in this illustrative aspect) input circuits 20, a plurality of (eight in this illustrative aspect) output circuits 30, a reference-temperature setting circuit 40, and a regulator IC 50, etc. Note that the numbers of the input circuits 20 and the output circuits 30 are suitably modified in accordance with the number of the wires to be protected.

The microcomputer 10 corresponds to an "operation circuit" and a "protection circuit" of the present invention. The microcomputer 10 calculates the rise in temperature $\Delta Tw$ of the wire harness while estimates the temperature Tp of the wire harness, which will be described below. The microcomputer 10 includes a WDT (a watchdog terminal) 11, a oscillator terminal 12, a plurality of I/O terminals 13, and a plurality of A/D conversion input terminals 14, etc. Note that the microcomputer 10 executes actions (such as operation, determination, protection, etc.) of the present invention for protecting the wire (i.e. actions of a wire protection method) in accordance with instruction of a program contained in a memory (not illustrated in the figure) in the microcomputer 10.

Each input circuit 20 includes an input I/F (interface) circuit. Various input signals toward the microcomputer 10 are inputted to the input circuits 20 and are converted into signals suited to the microcomputer 10.

Each output circuit 30 includes an output I/F circuit 31, an IPS (intelligent power switch) 32, a CR low pass filter 33, and a current-voltage conversion circuit (conversion circuit) 34, etc.

The IPS 32 includes a semiconductor switching element (here, an n-channel MOSFET) 35, a charge pump 36, a self-protection circuit 37, and a sense MOSFET (corresponding to a "current detection circuit" of the present invention) 38. The semiconductor switching element 35 turns on/off the applied-current I from a power source Vdc to a load. The charge pump 36 steps up a control voltage toward the semiconductor switching element 35. The self-protection circuit 37 protects the semiconductor switching element 35 from an overcurrent. The sense MOSFET 38 generates a sense current having a predetermined proportional relationship with the load current I.

The sense current is converted by the current-voltage conversion circuit 34 into a sense voltage signal (conversion signal) Vsens having a proportional relationship with the sense current. The current-voltage conversion circuit 34 is configured by, for example, a sense-current detection resistor. The sense voltage signal Vsens is supplied to the CR low pass filter 33. The CR low pass filter 33 eliminates predetermined high-frequency components from the sense voltage signal Vsens and supplies the sense voltage signal Vsens after elimination of the high-frequency components to the A/D conversion input terminal 14 of the microcomputer 10. Note here that the time constant of the CR low pass filter 33 should be larger (or should be sufficiently larger) than a sampling interval (the predetermined time) while should be smaller (or should be sufficiently smaller) than the heat radiation coefficient of the harness. In this illustrative aspect, the time constant of the CR low pass filter 33 is assumed to be 20 ms. In this case, the speed of the current conversion signal is reduced so that the microcomputer can perform operation.

The microcomputer 1 converts the sense voltage signal Vsens into the applied-current I. For example, the microcomputer 1 obtains an actual value of the applied-current I from a map of correspondence between the sense voltage signal Vsens and the applied-current I. The map of correspondence is contained in, for example, the memory (not illustrated) in the microcomputer 10.

The reference-temperature setting circuit 40 sets the reference temperature at a time of start of the estimation of the wire temperature by the microcomputer 10. The reference-temperature setting circuit 40 includes, for example, a temperature sensor (not illustrated in the figure) and an amplifier circuit (not illustrated in the figure). The temperature sensor is, for example, provided in an engine room of a vehicle. The amplifier circuit amplifies a sensor signal from the temperature sensor, thereby generating a temperature signal that indicates a temperature of the engine room. The reference-temperature setting circuit 40 supplies the temperature signal, which indicates the temperature of the engine room, as the reference temperature to the A/D conversion input terminal 14 of the microcomputer 10. Note that, depending on the number of environmental temperatures to be detected, the reference-temperature setting circuit 40 includes a plurality of temperature sensors and a plurality of amplifier circuits. Moreover, the reference-temperature setting circuit 40 may also include, for example, a comparison circuit for selecting one of the detected plurality of environmental temperature as the reference temperature.

The regulator IC 50 converts a predetermined DC voltage, e.g. 12 V, to a power source voltage, e.g. 5 V, for the microcomputer 10 and supplies the DC voltage of 5 V to the microcomputer 10.

<Wire Temperature Estimation Method>

Figure 3:
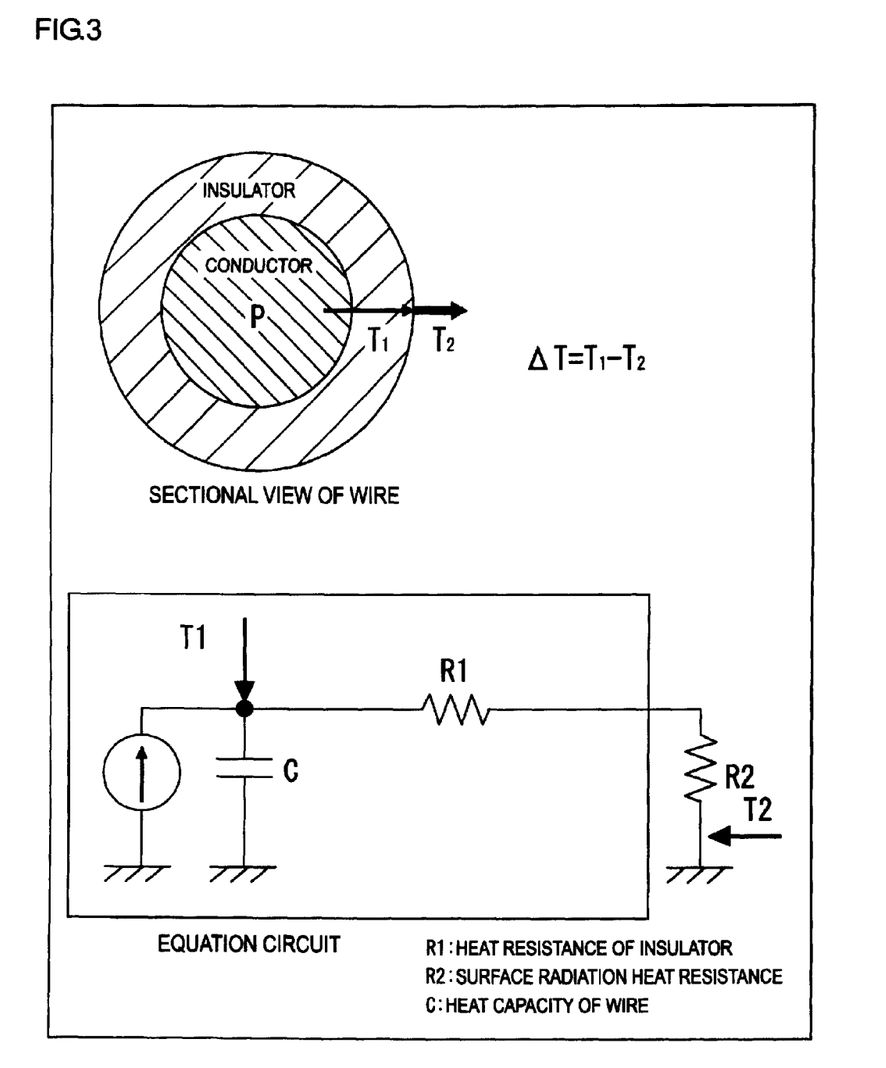
FIG. 3 is an explanatory view explaining a wire temperature estimation model in accordance with the present invention.
Figure 4:
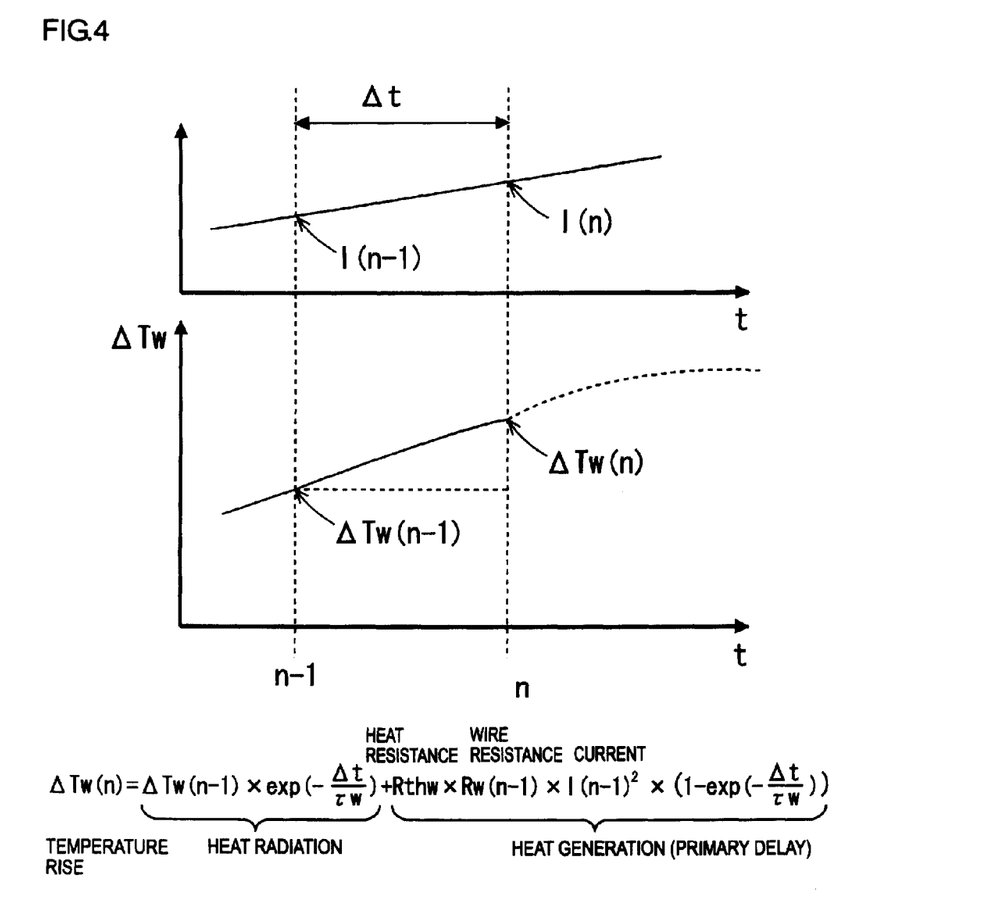
FIG. 4 is an explanatory view explaining a wire temperature estimation operation in accordance with the present invention.

Next, the wire temperature estimation method by the microcomputer 10 will be explained with reference to FIGS. 3 through 5. FIG. 3 is a view explaining a wire temperature estimation model. In this figure, the wire rise temperature $\Delta T$ is illustrated as a difference between the heat generation T1 of a wire conductor and the heat radiation T2 of the wire. An equivalent circuit of FIG. 3 is an illustration of an equivalent circuit with respect to heat.

The microcomputer 10 calculates the wire rise temperature (rise in temperature of the wire) $\Delta Tw$ by substituting a value of the detected applied-current I into a relational expression concerning the heat radiation and the heat generation of the wire. The relational expression is illustrated in FIG. 4 and expressed by Formula 1 as below. Formula 1 has, as illustrated in FIG. 4, a term concerning the heat radiation of the wire and a term concerning the heat generation of the wire:

$$\Delta Tw(n) = \Delta Tw(n-1) * \exp(-\Delta t/\tau w) + Rthw$$
$$* Rw(n-1) * I(n-1)^2 * (1-\exp(-\Delta t/\tau w)) \quad \text{(Formula 1)},$$

where:

I(n) is a current value (A) in an n-th sampling (detection), n being an integral number equal to or larger than 1;

$\Delta Tw(n)$ is the wire rise temperature (the rise in temperature of the wire) (° C.) in the n-th sampling;

Rw(n) is a resistance (Ω) of the wire in the n-th sampling;

Rw(0) is a resistance (Ω) of the harness (wire) at a temperature To;

Rthw is a heat resistance (° C./W) of the harness (wire);

$\tau w$ is a heat-radiation time constant (s) of the harness (wire);

κw is a resistance temperature coefficient (/° C.) of the harness (wire); and $\Delta t$ is the sampling interval (the predetermined time) (s).

The microcomputer 10 estimates the present wire temperature Tp by adding the calculated wire rise temperature $\Delta Tw$ to the reference temperature. In the estimation, the microcomputer 10 calculates the wire temperature change $\Delta Ts$ per the sampling interval (the predetermined time) $\Delta t$ and, using the temperature change $\Delta Ts$ per the sampling interval $\Delta t$, calculates the wire rise temperature $\Delta Tw$.

Next, the microcomputer 10 determines whether the present wire temperature Tp is lower than the predetermined upper limit temperature Tmax of the wire by comparing the present wire temperature Tp with the predetermined upper limit temperature Tmax. Upon determination that the wire temperature Tp is lower than the upper limit temperature Tmax, the microcomputer 10 newly calculates the wire rise temperature $\Delta Tw(n)$ from the reference temperature up to the present by calculating the temperature change $\Delta Ts$ per the next sampling interval $\Delta t$ and adding the temperature change $\Delta Ts$ per the sampling interval $\Delta t$ to the wire rise temperature $\Delta Tw(n-1)$ that has been calculated last time. The microcomputer 10 adds the calculated rise in temperature $\Delta Tw(n)$ to the reference temperature, thereby defining the present wire temperature Tp. The microcomputer 10 repeats the calculation of the rise in temperature $\Delta Tw$, the estimation of the wire temperature Tp, and the comparison of the wire temperature Tp with the upper limit temperature Tmax until the wire temperature Tp becomes equal to or higher than the upper limit temperature Tmax.

Note that the temperature change $\Delta Ts$ per the sampling interval $\Delta t$ is expressed by Formula 1A (a transformation of the Formula 1), which is as follows:

$$\Delta Ts = \Delta Tw(n) - \Delta Tw(n-1) \quad \text{(Formula 1A)}$$
$$= (Rthw * Rw(n-1) * I(n-1)^2 - \Delta Tw(n-1)) *$$
$$(1-\exp(-\Delta t/\tau w))$$

Then, upon determination that the wire temperature Tp is not lower than the upper limit temperature Tmax, i.e. upon determination that the wire temperature Tp is equal to or higher than the upper limit temperature Tmax, the microcomputer 10 generates a protection signal and supplies the protection signal to the IPS 32. The protection signal is for turning off the semiconductor switching element 35 and thereby protecting the wire. The semiconductor switching element 35 is turned off by the protection signal, and the applied-current to the wire is broken. Thus, further wire rise temperature is avoided.

Figure 5:
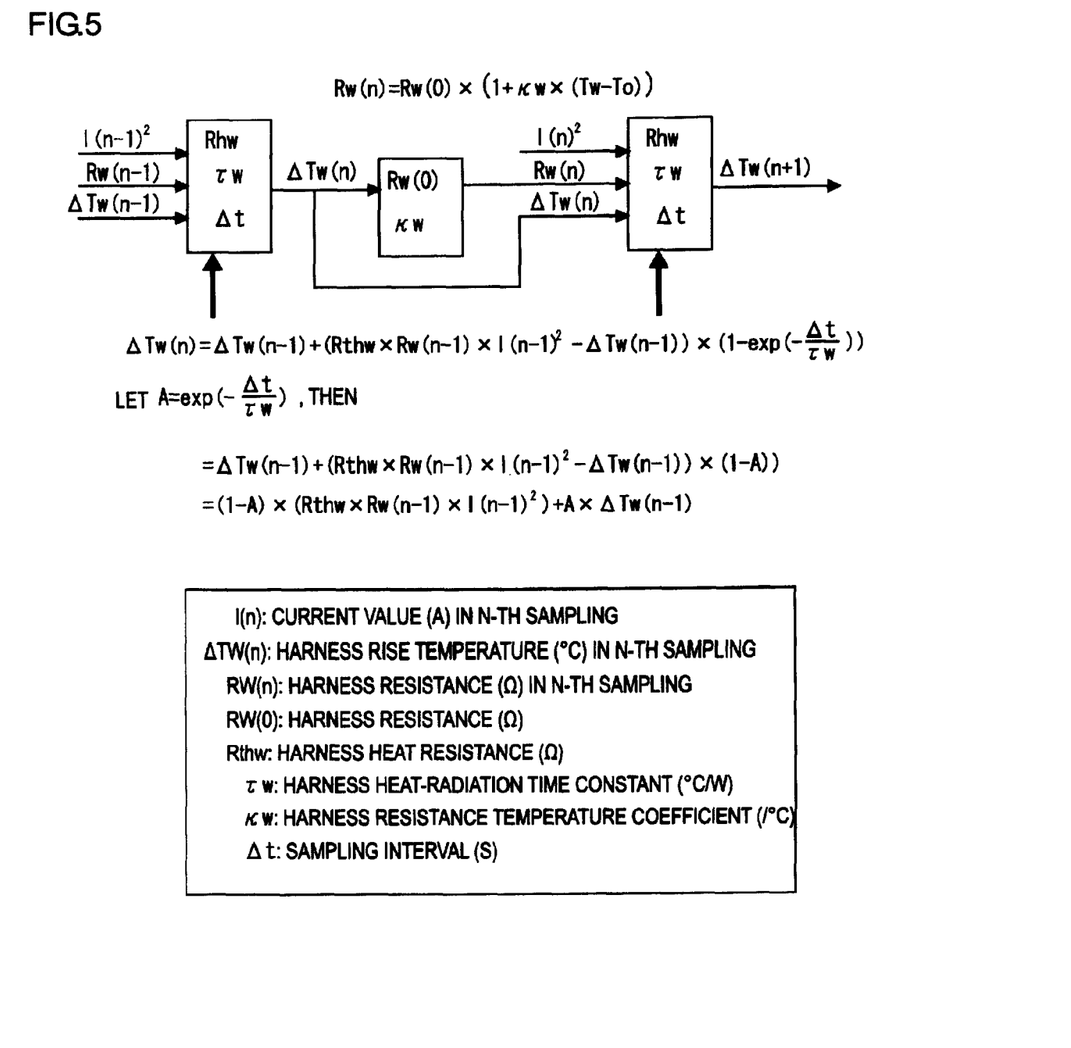
FIG. 5 is an explanatory view explaining a wire temperature estimation operational expression in accordance with the present invention.

FIG. 5 is a view explaining Formula 1 more in details. Note here that, as illustrated in FIG. 5 and expressed by following Formula 2, the wire resistance Rw(n) in the n-th sampling is a variable that depends on the wire rise temperature ΔTw(n), i.e. (Tw−To).

$$Rw(n)=Rw(0)\times(1+\kappa w\times(Tw-To)) \qquad \text{(Formula 2),}$$

where:

Tw is the wire temperature (° C.) in the n-th detection; and
To is the predetermined temperature (e.g. 20° C.).

Furthermore, a formula concerning the wire rise temperature ΔTw(n), the formula being illustrated in FIG. 5, illustrates the process to the Formula 1 and has an identical content with the Formula 1. Note here that the sampling interval Δt, the harness heat radiation time constant τw, the harness heat resistance Rthw, and the harness resistance (the initial value, e.g. a value at 20° C.) Rw(0) are constants that are set in accordance with the wire that is subject to the temperature estimation.

<Test Example>

Figure 6:
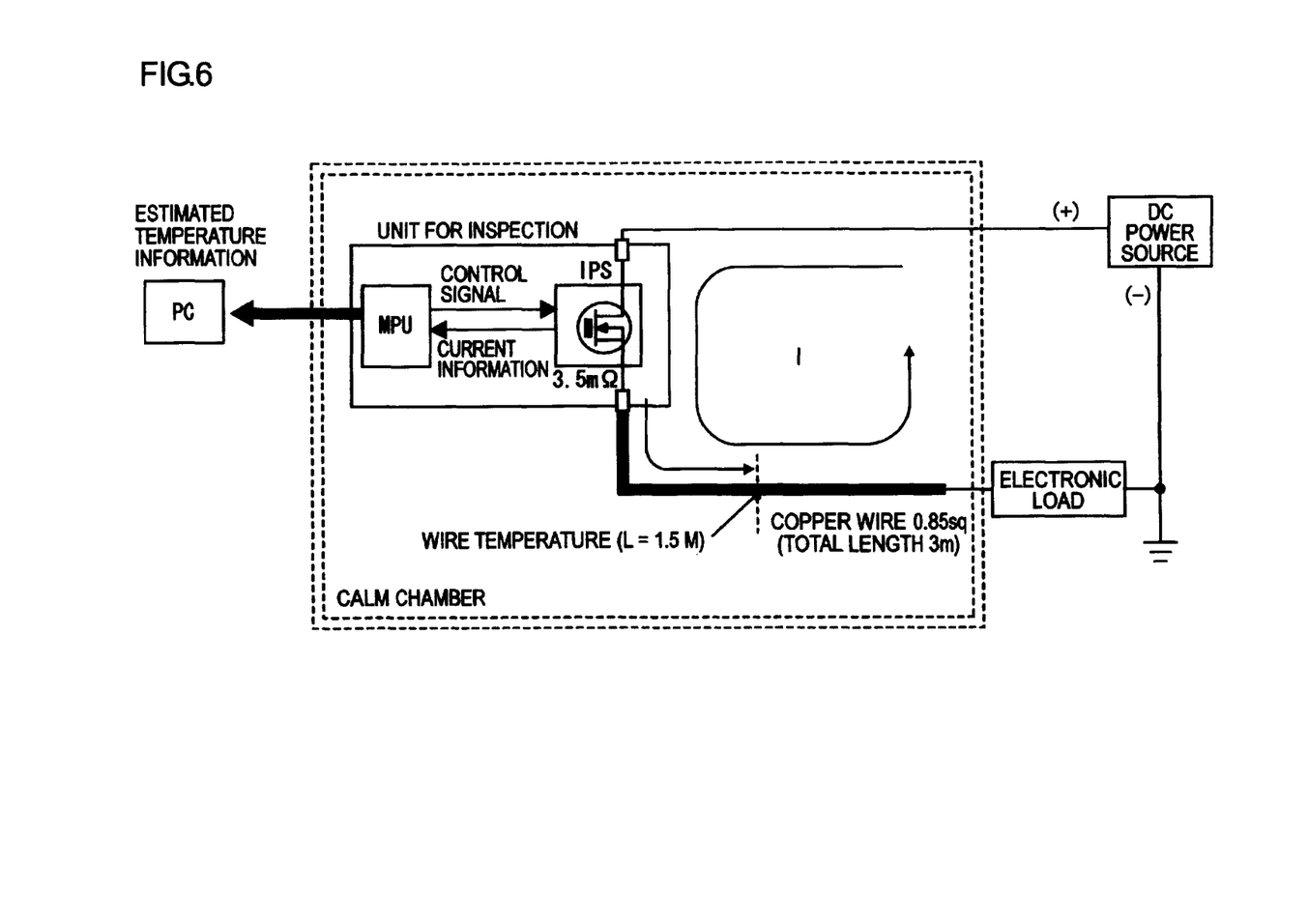
FIG. 6 is an explanatory view illustrating test conditions for wire temperature estimation.

Next, a test example of the wire temperature estimation in accordance with the present invention will be explained with reference to FIGS. 6 through 10. FIG. 6 is an explanatory view illustrating test conditions of the wire temperature estimation in accordance with the present invention. In this test, a copper wire (AVSS 0.85 sq) having a cross section of 0.85 square mm and a length of 3 m was used as a test wire, and a semiconductor switching element having an on-state resistance of 3.5 mΩ was used. The actual wire temperature was measured at an intermediate point of the wire. The test wire and a wire temperature estimation testing device were placed in a constant temperature chamber that is set to a calm environment with a temperature of 25° C.

Figure 7:
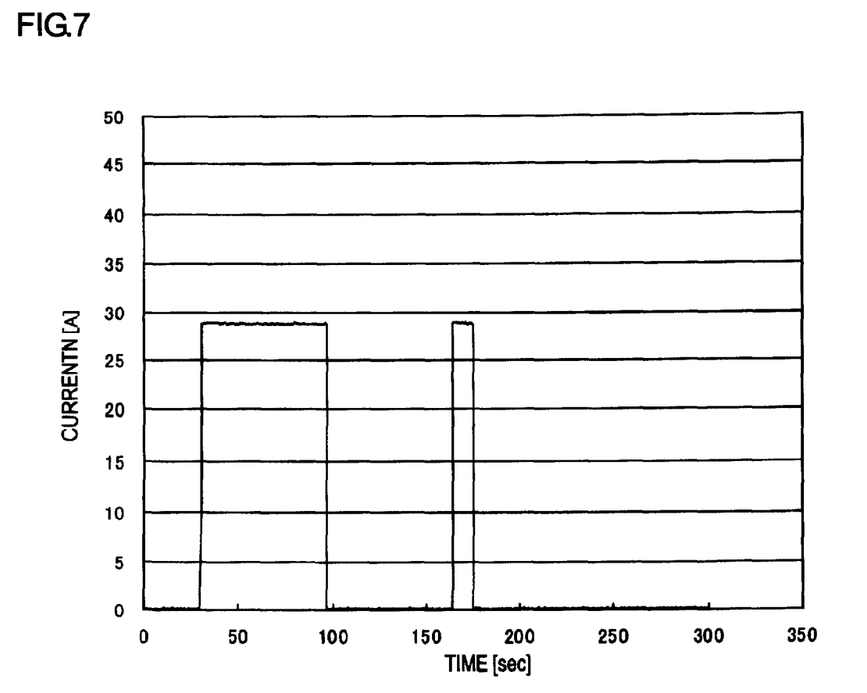
FIG. 7 is a waveform chart of a test step current that was used in a wire estimation test.
Figure 8:
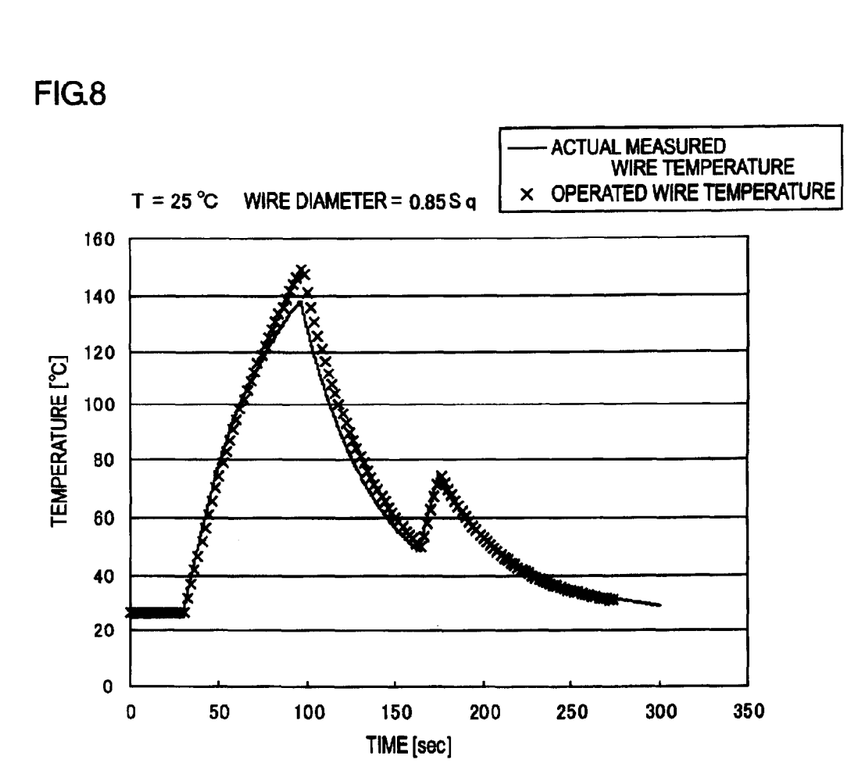
FIG. 8 is a graph illustrating wire temperature changes with respect to the test current of FIG. 7.

FIG. 7 is a graph illustrating a waveform of a step current that was used in the test. FIG. 8 is a graph illustrating operated wire temperature changes and actual measured wire temperature changes with respect to the step current. As illustrated in FIG. 8, it was observed that the operated wire temperature changes are almost equal to the actual measured wire temperature changes.

Figure 9:
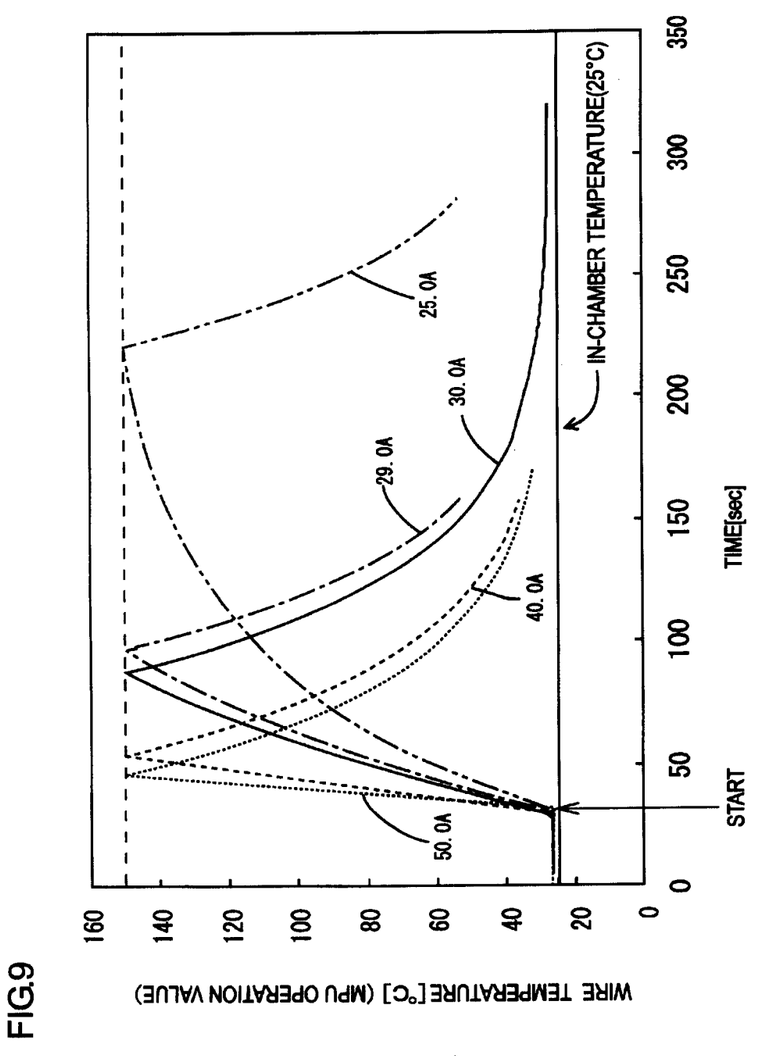
FIG. 9 is a graph illustrating a time change of an operated wire temperature corresponding to test step currents having different current values.
Figure 10:
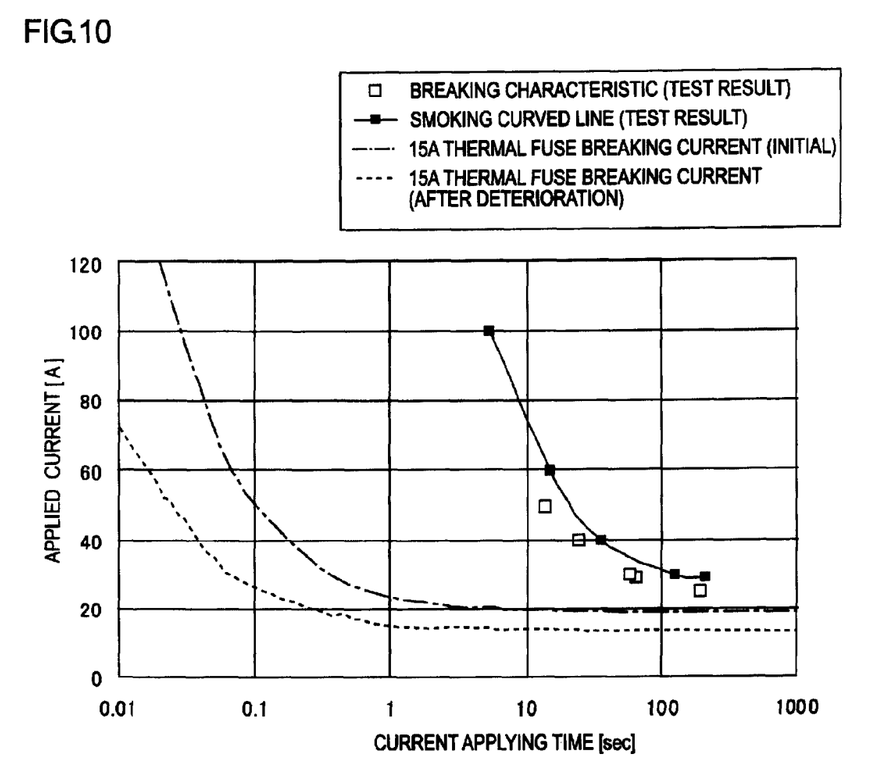
FIG. 10 is a graph illustrating a relation between breaking characteristics according to a result of the test of the wire temperature estimations and a fusing characteristic of a conventional thermal fuse.

FIG. 9 is a graph illustrating the operated wire temperature changes per time with respect to the test step currents having different current values. FIG. 10 is a graph illustrating a relation between a test result of limitation characteristics and a breaking characteristic of a conventional thermal fuse by the test step currents. The upper limit (breaking) temperature was set at 150° C. As illustrated in FIG. 9, the step currents having five current values (25.0 A, 29.0 A, 30.0 A, 40.0 A, and 50.0 A) were used as the test step current, and it was observed that the currents were broken 194.3 sec., 65.6 sec., 59.3 sec., 24.5 sec., and 14.0 sec., respectively, after the test had started. Furthermore, it was observed from plotting the relation between the current applying times to breaking and the current values by the test, that the plot points are located along a smoking curved line (the limitation characteristic) of the copper wire. Accordingly, in comparison with the case (illustrated in FIG. 10) of using the conventional thermal fuse, the wire temperature estimation method in accordance with the present invention includes no factor of deterioration due to the inrush current and, moreover, provides accurate temperature estimation. This makes it possible also to provide the current just before the wire smokes.

<Effects>

As explained above, in this illustrative aspect, the applied-current I is detected every predetermined sampling interval Δt, the present wire temperature Tp is estimated using the applied-current I, and the wire temperature Tp and the upper limit temperature Tmax that the wire allows for are compared. Because of this, even in a case where the wire temperature Pt has risen due to the short-circuited current that repeats turning on/off as illustrated in FIG. 11, the rise of the wire temperature Tp can be reliably detected so that the applied-current is broken before the wire reaches the smoking temperature. As a result of this, smoking of the wire can be prevented.

Moreover, because the wire temperature Tp is estimated only by the detection of the applied-current I, the structure concerning the wire protection can be easily configured.

Moreover, the configuration of the wire protection circuit 100 in accordance with the present invention can be configured using existing elements. Therefore, the manufacture cost can be less. Besides, modification from an existing protection circuit is easier.

Moreover, the wire protection circuit 100 in accordance with the present invention can be adapted to protection of a plurality of output circuits 10, i.e. a plurality of wires under control of the single microcomputer 10. Therefore, the parts count and the cost for the entire wire protection circuit 100 can be reduced.

<Other Illustrative Aspects>

The present invention is not limited to the illustrative aspect explained above with reference to the drawings. For example, the following illustrative aspects are also included within the scope of the present invention.

(1) In the above illustrative aspect, the wire resistance Rw(n) in the n-th sampling is illustratively a variable that depends on the wire rise temperature ΔTw(n) and is found out using the Formula 2. The wire resistance Rw(n) is not particularly limited to this. The wire rise temperature ΔTw may be calculated with the wire resistance Rw that is a constant value regardless of the temperature. In this case, suitable selecting the constant value makes it possible to suitably modify the time before the wire temperature Tp reaches the upper limit temperature Tmax in accordance with the requirement to protect the wire. That is, wire protection measures can be taken corresponding to the degree of the wire protection.

The rise in temperature ΔTw may be calculated with, for example, the wire resistance Rw fixed at a value corresponding to the wire upper limit temperature Tmax. In this case, the rise in temperature ΔTw is calculated under conditions where a condition related to the wire rise temperature is severer than an actual condition, i.e. under conditions where the wire rise temperature is larger than the actual wire rise temperature. Therefore, fixing the wire resistance Rw at a value corresponding to the wire upper limit temperature Tmax is suitable in a case where more rapid wire protection is desired.

(2) In the above-explained illustrative aspect, the temperature of the engine room is illustratively taken as the reference temperature. The reference temperature is not limited to this. For example, in a case where the wire to be protected is disposed in a vehicle compartment, the vehicle compartment temperature may be taken as the reference temperature; or, in a case where a most part of the wire to be protected is disposed outside the vehicle, the vehicle external temperature may be taken as the reference temperature. What is essential is that the reference temperature is set in accordance with the environmental temperature of a place where the wire to be protected is disposed.

Moreover, in a case where the wire to be protected extends over environments having different temperatures (such as the engine room and the inside of the vehicle compartment), the reference temperature may be set at a highest one of the environmental temperatures of the places where the wire is disposed (in this case, the temperature of the engine room). In this case, the rise in temperature ΔTw is calculated under the conditions where the condition related to the wire rise temperature is the severest, i.e. under the conditions where the wire rise temperature is the largest. Therefore, the wire is reliably protected at an earlier stage.

(3) In the configuration of the above-explained illustrative aspect, the reference-temperature setting circuit 40 is separate from the microcomputer 10. It may be configured such that the function of the reference-temperature setting circuit 40 is performed by the microcomputer 10. Then, the microcomputer 10 receives the information concerning the environmental temperature from separately arranged temperature sensors and sets the reference temperature using the temperature information.

(4) In the above-explained illustrative aspect, the n-channel MOSFET is illustratively used as the semiconductor switching element 35. The present invention is not limited to this. For example, a p-channel MOSFET or a bipolar transistor may be used as the semiconductor switching element 35.

(5) In the above-explained illustrative aspect, the applied-current I is detected illustratively by the sense MOSFET 38. The present invention is not limited to this. For example, the applied-current I may be detected using a shunt resistor.

(6) In the above-explained illustrative aspect, the operation circuit and the protection circuit are configured illustratively by the microcomputer, and the actions of the wire protection method in accordance with the present invention is executed illustratively by the microcomputer. The present invention is not limited to this. The operation circuit and the protection circuit may be configured separately by, for example, logic circuits.

The invention claimed is:

1. A wire protection method of protecting a wire used for supplying electric power from a power source to a load, the method comprising the steps of:
    detecting an applied-current to the load every predetermined time;
    estimating a temperature of the wire, wherein the estimating includes: calculating a rise in temperature of the wire from a reference temperature based on heat generation and heat radiation of the wire due to the detected applied-current per the predetermined time; and adding the wire rise temperature to the reference temperature;
    determining whether the estimated wire temperature is lower than a predetermined upper limit temperature;
    newly estimating the wire temperature upon determination in the determining step that the estimated wire temperature is lower than the predetermined upper limit temperature, wherein the newly estimating includes: calculating a new rise in temperature of the wire from the reference temperature using the rise in temperature, the new rise in temperature based on the heat generation and the heat radiation of the wire due to a newly detected applied-current per the predetermined time; and adding the new wire rise temperature to the reference temperature; and
    stopping the electric power supply from the power source to the load upon determination in the determining step that the estimated wire temperature is equal to or higher than the predetermined upper limit temperature.

2. The wire protection method according to claim 1, wherein:
    the estimating the wire temperature includes calculating the wire rise temperature based on a relational expression related to the heat generation and the heat radiation of the wire.

3. The wire protection method according to claim 2, wherein:
    the estimating the wire temperature includes calculating the wire rise temperature using a following formula as the relational expression:

$$\Delta Tw(n)=\Delta Tw(n-1)*\exp(-\Delta t/\tau w)+Rthw$$
$$*Rw(n-1)*I(n-1)2*(1-\exp(-\Delta t/\tau w)),$$

where:
    I(n) is a detected applied-current value (A) in the n-th detection, n being an integral number equal to or larger than 1;
    $\Delta Tw(n)$ is the wire rise temperature (° C.) in the n-th detection;
    Rw(n) is a resistance (Ω) of the wire in the n-th detection, wherein Rw(n)=Rw(0)*(1+κw*(Tw−To));
    Rw(0) is a resistance (Ω) of the wire at a temperature To;
    Rthw is a heat resistance (° C./W) of the wire;
    τw is a heat-radiation time constant (s) of the wire;
    κw is a resistance temperature coefficient (/° C.) of the wire;
    $\Delta t$ is the predetermined time (s); and
    Tw=[reference temperature]+$\Delta Tw(n)$, wherein Tw is the wire temperature (° C.) in the n-th detection.

4. The wire protection method according to claim 3, wherein:
    the estimating the wire temperature includes calculating the wire rise temperature with the Rw(n) in the relational expression, the Rw(n) being regarded as a constant value independent from a temperature.

5. The wire protection method according to claim 4, wherein:
    the value of the Rw(n) corresponding to the predetermined upper limit temperature is used as the constant value.

6. The wire protection method according to claim 1, wherein:
    the estimating the wire temperature includes setting the reference temperature in accordance with an environmental temperature of a place where the wire is disposed.

7. The wire protection method according to claim 6 comprises setting the reference temperature at a highest one of the environmental temperatures of the place where the wire is disposed.

8. A wire protection device that protects a wire provided between a power source and a load and used for supplying electric power from the power source to the load, the device comprising:
    a semiconductor switching element that is provided in a current applying path from the power source to the load and switches the power supply to the load;
    a current detection circuit that detects an applied-current to the load every predetermined time, the applied-current flowing through the semiconductor switching element;
    an operation circuit that calculates a rise in temperature of the wire from a reference temperature based on heat generation and heat radiation of the wire due to the detected applied-current per the predetermined time; and adds the wire rise temperature to the reference temperature, thereby estimating a temperature of the wire; and
    a protection circuit that determines whether the estimated wire temperature is lower than a predetermined upper limit temperature, wherein:
    the protection circuit, upon determination that the estimated wire temperature is lower than the predetermined upper limit temperature, causes the operation circuit to calculate a new rise in temperature of the wire from the reference temperature using the rise in temperature, the new rise in temperature based on the heat generation and the heat radiation of the wire due to a newly detected applied-current per the predetermined time: and to newly estimate the wire temperature, wherein the new estimation includes to add the new wire rise temperature to the reference temperature; and the protection circuit, upon determination that the estimated wire temperature is equal to or higher than the predetermined upper limit temperature, turns off the semiconductor switching element and stops the electric power supply from the power source to the load.

9. The wire protection device according to claim 8, wherein:

the operation circuit calculates the wire rise temperature based on a relational expression related to the heat generation and the heat radiation of the wire.

10. The wire protection device according to claim 9, wherein:

the operation circuit calculates the wire rise temperature using a following formula as the relational expression:

$$\Delta Tw(n) = \Delta Tw(n-1) * \exp(-\Delta t/\tau w) + Rthw * Rw(n-1) * I(n-1)^2 * (1 - \exp(-\Delta t/\tau w)),$$

where:

I(n) is a detected applied-current value (A) in the n-th detection, n being an integral number equal to or larger than 1 (one);

$\Delta Tw(n)$ is the wire rise temperature (° C.) in the n-th detection;

Rw(n) is a resistance (Ω) of the wire in the n-th detection, wherein $Rw(n) = Rw(0) * (1 + \kappa w * (Tw - To))$;

Rw(0) is a resistance (Ω) of the wire at a temperature To;

Rthw is a heat resistance (° C./W) of the wire;

τw is a heat-radiation time constant (s) of the wire;

κw is a resistance temperature coefficient (/° C.) of the wire;

$\Delta t$ is the predetermined time (s); and

Tw=[reference temperature]+$\Delta Tw(n)$, wherein Tw is the wire temperature (° C.) in the n-th detection.

11. The wire protection device according to claim 10, wherein:

the operation circuit calculates the wire rise temperature with the Rw(n) in the relational expression, the Rw(n) being regarded as a constant value independent from a temperature.

12. The wire protection device according to claim 11, wherein:

the value of the Rw(n) corresponding to the predetermined upper limit temperature and is used as the constant value.

13. The wire protection device according to claim 8 further comprising:

a reference-temperature setting circuit that sets the reference temperature in accordance with an environmental temperature of a place where the wire is disposed.

14. The wire protection device according to claim 13, wherein:

the reference-temperature setting circuit sets the reference temperature at a highest one of the environmental temperatures of the places where the wires are disposed.

15. The wire protection device according to claim 8, the wire protection device further comprising a conversion circuit and a low pass filter, the conversion circuit converting the applied-current into a voltage and thereby generates a conversion signal, the low pass filter filters the conversion signal, wherein:

the low pass filter has a time constant that is larger than the predetermined time and is smaller than the wire heat-radiation time constant.

16. The wire protection device according to claim 8, wherein:

the wire is a vehicle wire harness to be disposed between the semiconductor switching element and the load; and the operation circuit and the protection circuit are configured as a microcomputer.

17. The wire protection device according to claim 8, wherein:

the operation circuit and the protection circuit are configured by a hardware logic.

* * * * *